United States Patent
Roberts

(10) Patent No.: US 11,237,972 B2
(45) Date of Patent: Feb. 1, 2022

(54) METHOD AND APPARATUS FOR CONTROLLING CACHE LINE STORAGE IN CACHE MEMORY

(71) Applicant: Advanced Micro Devices, Inc., Santa Clara, CA (US)

(72) Inventor: David A. Roberts, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 814 days.

(21) Appl. No.: 15/857,837

(22) Filed: Dec. 29, 2017

(65) Prior Publication Data
US 2019/0205253 A1   Jul. 4, 2019

(51) Int. Cl.
G06F 12/08 (2016.01)
G06F 12/0846 (2016.01)
G06F 12/0862 (2016.01)
G06F 12/0815 (2016.01)

(52) U.S. Cl.
CPC ...... *G06F 12/0848* (2013.01); *G06F 12/0815* (2013.01); *G06F 12/0862* (2013.01); *G06F 2212/282* (2013.01); *G06F 2212/602* (2013.01); *G06F 2212/621* (2013.01)

(58) Field of Classification Search
CPC ............. G06F 12/0848; G06F 12/0853; G06F 12/0893; G06F 2212/282–284; G06F 2212/604; G06F 2212/3042; G06F 2212/305; G06F 11/10–1036
See application file for complete search history.

(56) References Cited

U.S. PATENT DOCUMENTS

| 6,178,479 B1 * | 1/2001 | Vishin | G11C 11/4076 711/106 |
| 2005/0193176 A1 * | 9/2005 | Edirisooriya | G06F 12/126 711/144 |
| 2008/0215829 A1 * | 9/2008 | Lin | G06F 3/061 711/155 |

(Continued)

OTHER PUBLICATIONS

Carnegie Mellon University , Philip Koopman, Memory System Architecture, Cache Organization, Sep. 2, 1998 (Year: 1998).*

(Continued)

*Primary Examiner* — Khoa D Doan
(74) *Attorney, Agent, or Firm* — Faegre Drinker Biddle & Reath LLP

(57) ABSTRACT

A method and apparatus physically partitions clean and dirty cache lines into separate memory partitions, such as one or more banks, so that during low power operation, a cache memory controller reduces power consumption of the cache memory containing the clean only data. The cache memory controller controls a refresh operation so that a data refresh does not occur for the clean data only banks or the refresh rate is reduced for the clean data only banks. Partitions that store dirty data can also store clean data; however, other partitions are designated for storing only clean data so that the partitions can have their refresh rate reduced or refresh stopped for periods of time. When multiple DRAM dies or packages are employed, the partition can occur on a die or package level as opposed to a bank level within a die.

23 Claims, 5 Drawing Sheets

(56) References Cited

U.S. PATENT DOCUMENTS

| | | | |
|---|---|---|---|
| 2008/0320227 A1* | 12/2008 | Miura | G06F 12/12 711/133 |
| 2010/0250857 A1* | 9/2010 | Matsui | G06F 12/0859 711/133 |
| 2011/0093654 A1 | 4/2011 | Roberts et al. | |
| 2014/0181412 A1* | 6/2014 | Thottethodi | G06F 12/0871 711/133 |
| 2014/0281248 A1* | 9/2014 | Alameldeen | G06F 12/0862 711/128 |

OTHER PUBLICATIONS

S. Baek, S. Cho and R. Melhem, "Refresh Now and Then," in IEEE Transactions on Computers, vol. 63, No. 12, pp. 3114-3126, Dec. 2014 (Year: 2014).*

Park, Seon-yeong et al.; CFLRU: A Replacement Algorithm for Flash Memory; Division of Computer Science; Korea Advanced Institute of Science and Technology (KAIST); 2005.

Wilkerson, Chris et al.; Reducing Cache Power with Low-Cost, Multi-bit Error-Correcting Codes; ISCA '10; Jun. 2010.

Kgil, Taeho et al.; Improving NAND Flash Based Disk Caches; IEEE; 2008.

* cited by examiner

METHOD AND APPARATUS FOR CONTROLLING CACHE LINE STORAGE IN CACHE MEMORY

BACKGROUND OF THE DISCLOSURE

Processors, such as central processing units, graphics processing units and other processors employ cache memory to quickly store and access data that is typically used often to save time from storing and retrieving the data in main memory which can take longer to access. Many devices such as smart phones, internet servers, wearables, laptops, tablets, printers and many other devices employ volatile memory such as dynamic random access memory (DRAM) as cache memory. As is known in the art, a cache line, also referred to as a cache block, is stored in a cache set in a cache memory bank. Cache memory controllers store state data for each cache line. The state data can include, for example, a valid bit indicating whether or not the location is currently being used to cache data from memory, a dirty bit indicating whether or not the cached data has been changed by a processor without changing the corresponding data in main memory, and tag data which is a unique identifier for a group of data in the cache.

Volatile memory such as DRAM loses its state if banks in the DRAM are not refreshed frequently enough. However, refreshing banks of memory consumes power, which for portable devices can unnecessarily drain limited battery resources. Cache memory banks, such as portions of DRAM memory, can be independently accessed and may have refresh circuitry that can be controlled. Also, stacked DRAM is employed to increase the amount of volatile random access memory that one or more processors can use in devices. Although cache memory banks can be controlled to reduce power consumption by, for example, turning off the refresh operation or reducing the refresh rate, typical systems turn off memory banks that do not have data stored in them to save power. However, memory banks that do have data stored in them are not turned off.

Other systems attempt to save power by compacting data from many DRAM chips to, for example, one DRAM chip by evicting data from cache memory from one chip to another. However, such systems typically move clean data from a cache unnecessarily.

Accordingly, a need exists for an improved cache memory system.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF EMBODIMENTS

Figure 1:
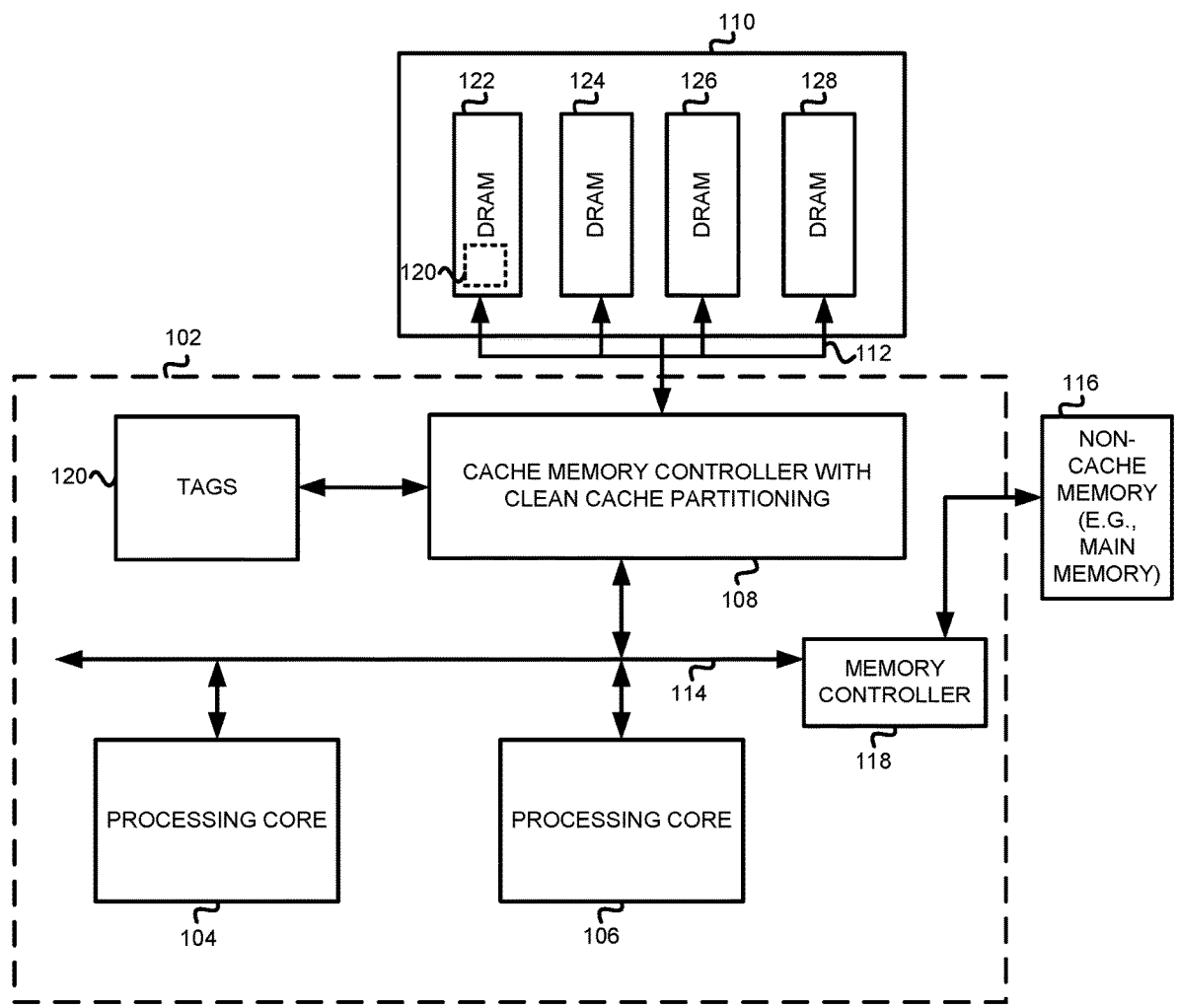
FIG. 1 is a block diagram illustrating one example of a device that employs an integrated circuit in accordance with the disclosure.

A method and apparatus physically partitions clean and dirty cache lines into separate memory partitions, such as one or more banks, so that during low power operation, a cache memory controller reduces power consumption of the cache memory containing the clean data only. The cache memory controller controls the refresh operation so that a data refresh does not occur for clean data only banks or the refresh rate is reduced for clean data only banks. Partitions that store dirty data can also store clean data; however, other partitions are designated for storing clean data only so that the partitions can have their refresh rate reduced or refresh stopped for periods of time. When multiple DRAM dies or packages are employed, the partition can occur on a die or package level as opposed to a bank level within a die.

Briefly, a method and apparatus partitions cache memory into at least a clean data only partition and a dirty data partition. In one example, a cache memory controller determines whether a cache line contains dirty data or clean data only. The cache memory controller stores the cache line containing dirty data in a cache memory partition designated to store dirty data when the cache line contains dirty data. When the cache line contains clean data, the cache line is stored in the clean data only partition.

In one example, the method and apparatus includes accessing a cache bank status register that contains cache bank partition data indicating which partition of cache memory stores clean data only and which partition of the memory stores dirty data. The method and apparatus reduces power consumption of at least one cache bank that is allocated to store clean data only based on the cache bank partition data. In one example, a cache memory controller reduces the refresh rate of the cache bank containing clean data only by disabling the refresh operation for that particular bank or by programming the refresh rate on an internal refresh circuit in the random access memory to reduce a refresh rate or turn off the refresh operation. If an entire die has been designated as a clean data only partition then the entire die refresh rate can be shut off or reduced. As such, the refresh rate can be reduced as part of a low power mode operation of an integrated circuit, device, or device subsystem.

In some embodiments, the method and apparatus determines whether a clean cache memory bank has been refreshed within a desired period of time, such as by using a counter or other suitable mechanism, and if not, then refetching the data from non-cache memory such as main memory. In some embodiments, when the clean cache memory bank has been refreshed within the desired period of time, the method and apparatus accesses the clean data from the cache bank designated for clean data only and uses the accessed clean data independent of an error correction check on the accessed data. In yet other embodiments, an error correction check such as a low overhead error correction check is performed instead of, or in addition to, checking to see whether the clean cache memory bank has been refreshed within a desired period of time. For example, a parity error detection process is employed or CRC codes are employed. In one example, the method includes accessing the clean data from the cache bank designated for clean data only and performing an error detection process on the accessed clean data and using the accessed clean data when the error detection check passes, otherwise refetching the clean data from the cache bank designated for clean data only.

In some embodiments, the method and apparatus partitions cache memory by designating at least one of a plurality of dynamic random access memories such as differing DRAM dies or DRAM packages, to store clean data only and at least a different one of the plurality of DRAM memories to store at least dirty data. The method and apparatus controls the DRAM memory designated to store clean data only, to have a lower power consumption than the DRAM memory designated to store the dirty data.

In some embodiments, the method and apparatus, in response to a read request or a write request, checks whether a cache tag associated with the address to be read or written matches a tag associated with a cache line in the cache memory. When a tag match is detected, the method and apparatus determines whether the address to be read or written corresponds to a cache line in the partition containing dirty data or the cache memory partition designated for clean data only.

In one embodiment, an integrated circuit includes one or more memory clients such as a processing core or other memory access engine that issues read and/or write requests for processing by a menu controller, and includes cache memory and a cache memory controller. The cache memory controller is operative to partition the cache memory into the clean data only partition and the dirty data partition and determine whether a cache line contains dirty data or clean data only. The cache memory controller is also operative to store the cache line containing dirty data in the cache memory partition designated to store dirty data when the cache line contains dirty data and also stores the cache line in the cache memory partition designated for clean data only, when the cache line contains only clean data. In one example, the integrated circuit also includes a cache bank status register that contains control data that allows the cache memory controller to partition the cache memory bank indicating which partition of cache memory stores clean data only and which partition of memory stores dirty data. In one example, the integrated circuit includes a counter that is used to determine whether the clean cache memory bank has been refreshed within a desired period of time. The integrated circuit carries out the above described process operations as well.

Figure 2:
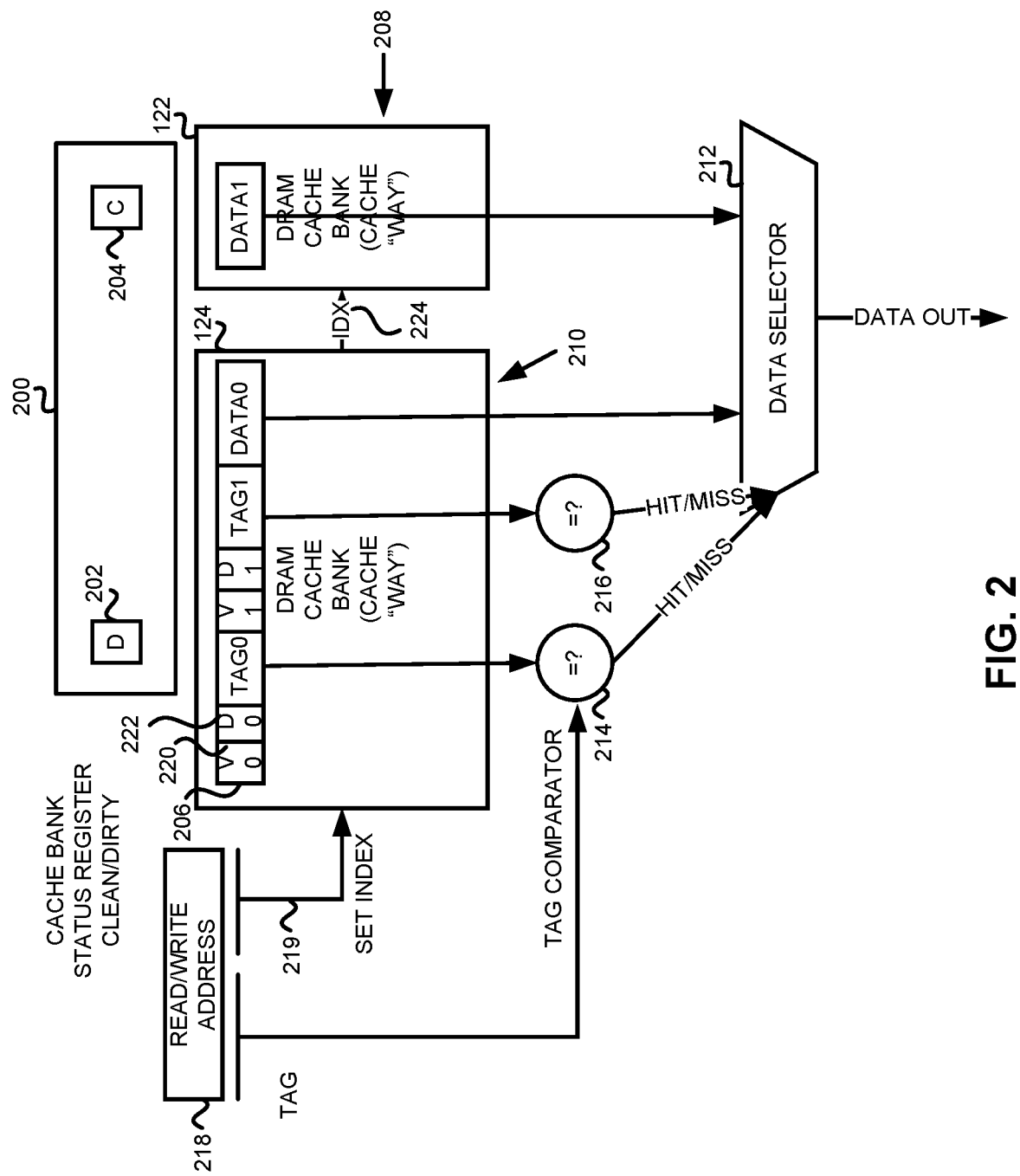
FIG. 2 is a block diagram illustrating one example of a cache controller in accordance with the disclosure.
Figures 3, 4:
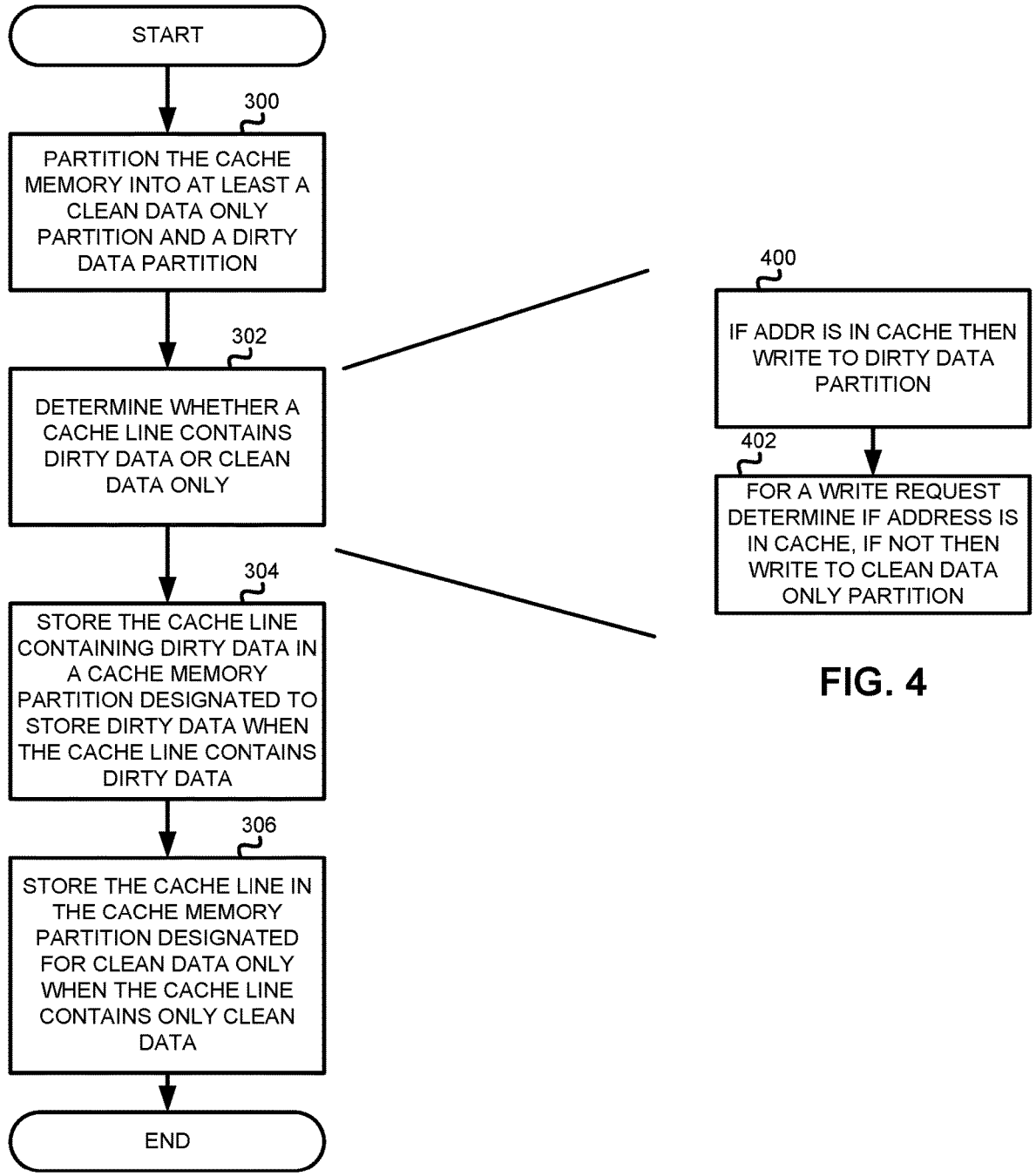
FIG. 3 is a flowchart illustrating one example of a method for controlling cache line storage in cache memory in accordance with the disclosure.
FIG. 4 is a flowchart illustrating one example of a method for controlling cache line storage in cache memory in accordance with the disclosure.

Referring to FIGS. 1-3, an example of an apparatus 100, such as a smart phone, laptop, tablet or other device includes an integrated circuit 102 such as a system on chip (SoC), a central processing unit (CPU), a graphics processing unit (GPU), accelerated processing unit (APU) or any other suitable integrated circuit. In this example, integrated circuit 102 includes multiple processing cores 104 and 106 which may be, for example, one or more CPU cores, GPU cores, or any other suitable processing core or circuit that serves as a memory client that issues read and/or write requests to a cache memory controller 108. The cache memory controller 108 includes a clean cache partition and power reduction mechanism as further described below. The cache memory controller 108 uses a tag memory 120 to store tag data and other data and accesses cache memory 110 through a suitable bus structure shown as 112. Similarly, processing cores 104 and 106 or other memory clients issue the read and write requests for the cache memory controller 108 via one or more communication buses illustrated as 114. In this example, non-cache memory 116, such as main memory is shown being accessible through a memory controller 118. However, the cache memory controller may be included as part of the memory controller 118 if desired.

In this example, the cache memory 110 is off-chip from the integrated circuit 102. However, it will be recognized that the cache memory 110 may also be located on-chip if desired and may be any suitable type of memory. In this example, the cache memory is volatile random access memory such as DRAM. However, any other suitable memory whether volatile or non-volatile random access memory may also be employed. The cache memory controller 108 stores cache tags and other cache line information in memory 120 which may be, for example, static random access memory (SRAM) or DRAM refreshed at a normal rate. In this example, the cache memory 110 consists of a plurality of DRAM dies 122-128 which may take any suitable form and may be packaged and stacked in a three-dimensional arrangement if desired in some embodiments. The cache memory 110 is used as the tag memory 120, such as a dirty bank, if desired as shown by dashed lines.

Referring also to FIGS. 2 and 3, the operation of the cache memory controller 108 will be described. As shown in FIG. 2, a cache bank status register 200 located, in this example, in the cache memory controller 108 includes cache status bits 202 and 204 indicating which partitions of cache memory 110 have been designated to store clean data only as represented by bit 204, and which banks of cache memory have been partitioned as a dirty partition of the cache memory 110 designated as 202. Cache line information 206 is stored, for example, in tag memory 120 (in this example shown to be stored in a partition designated as dirty) and is evaluated by the cache memory controller 108 in a conventional manner. The cache memory controller 108 may be implemented as one or more state machines, a programmed processor, or any suitable logic.

In this example, the setting of the cache bank status register bits 202, 204 to indicate which partition of cache memory 110 is to store clean data only and which cache memory is partitioned to store dirty data is done through software operations such as through a driver associated with a CPU, GPU or any other memory client or an operating system. In another example, the cache bank status register 200 is hard coded when the integrated circuit is powered up through a BIOS operation or any other suitable mechanism. As another alternative, the cache controller itself specifies which banks are clean or dirty depending upon the number of clean or dirty cache line requests that it receives.

Cache memory 110 that has been partitioned to store clean data only 208 also referred to as clean banks, do not need to be refreshed frequently or at all when the integrated circuit 102, apparatus 100, or other subsystems in a low power mode. The cache memory 110 partitions that store the dirty data 210 also referred to as dirty banks, are refreshed at a normal rate and contain dirty cache lines (and some clean data cache lines of the clean banks are full). As such, dirty banks can optionally store cache line tags if desired. Access to dirty banks proceeds as usual since data integrity is maintained with a standard refresh rate. Behavior differs for clean cache bank accesses in low refresh rate mode.

The cache memory controller 108 includes a data selector 212 and tag comparator logic 214 and 216 which operate in a conventional manner. For example, tag data stored in the tag memory 120 is compared to the tag portion of the read/write address 218 as received or provided to a memory client. The tag of the address seeking access to data is compared to the tag identifying the address in the cache controller to see if the cache line is present in the cache indicating a hit. If it is not present, then the indication is a miss and the data selector 212 provides the requisite data back to the memory client either from main memory (not shown) or if there is a hit, from either the partition of the dirty cache bank or the partition designated as the clean bank. Additional cache line bits are also evaluated as known in the art such as the valid data bit 220 and the dirty data bit 222 for each cache line. In this example, a logical 1 indicates a valid cache line and a logical 1 indicates a dirty cache line. As known in the art, the set index information 219 identifies a set of cache memory blocks within the cache memory. The cache memory controller 108 uses index data 224 identical to the signal 219 when accessing a cache line in any other bank.

Referring also to FIG. 3, a method of controlling cache line storage in cache memory includes, as shown in block 300, partitioning the cache memory 110 into at least a clean data only partition 208 and a dirty data partition 210. This is done, in one example, by the cache memory controller by accessing the cache bank status register 200 that contains cache bank partition data 202 and 204 indicating which partition of the cache memory 110 stores clean data only and which partition of cache memory 110 stores dirty data. The cache bank partition data 202 and 204 in this example can indicate a particular DRAM chip as being designated as a clean data only partition and other DRAM chips as dirty cache partition. Alternatively, banks within a DRAM may be designated as a partition for the clean data only partition and other banks within the DRAM as banks designated to store dirty data.

As shown in block 302, the method includes determining whether a cache line contains dirty data or clean data. In one example, this operation is also illustrated in FIG. 4. For example, when a line comes in to be cached, as shown in block 400, for a write operation, if the address is in the cache as determined through the requisite hit or miss determination, then the address is written to the dirty data partition 210. On a read hit, the data is read from wherever the data is located. As shown in block 402, for a read miss, if the address is not in the cache, then the method includes writing the data to the clean data only partition 208. For a write miss, the line is loaded from memory into the dirty bank, then the write is performed on the cache line. After the data is placed in the requisite partitions, the clean data only partition is controlled, for example, in the low power mode or any other suitable mode, to reduce its refresh rate compared to that of the dirty partition 210 and in some embodiments includes turning off or reducing the refresh rate of the particular bank or chip to reduce power consumption.

Referring back to FIG. 3, as shown in blocks 304 and 306, the cache memory controller 108 stores the cache line containing dirty data in the cache memory partition designated to store dirty data when the cache line contains dirty data and stores the cache line in the cache memory partition 208 designated for clean data only when the cache line contains clean data.

The cache memory controller 108 accesses the cache bank status register 200 in one example, that contains the cache bank partition data 202 and 204 indicating which partition of the cache memory stores clean data only and which partition of memory stores the dirty data only, to determine which banks can be controlled to have a reduced power, during a low power mode or normal operating mode. The clean data only partition(s), whether it be an entire DRAM memory or one or more banks within a DRAM memory, are controlled to have a lower power consumption than the DRAM memory designated to store the dirty data.

The method includes reducing the power consumption such as reducing the refresh rate of the cache bank by disabling refresh circuitry in one or more banks or by programming the refresh rate on an internal refresh circuit of the DRAM to change the refresh rate to a lower rate or to turn off the refresh operation of the cache bank allocated to store clean data only, using the cache bank partition data 202 and in this case, the data 204 indicating those portions of the cache memory that are designated as clean data only partitions.

The cache tags and dirty bits associated with the cache lines can be stored in differing ways. In one example, separate tag data and dirty bit data storage can be, for example, in the tag memory 120 such as an on-die SRAM. In another example, the tag information and dirty bit information can be stored in the dirty banks which are refreshed normally. The tag information can be protected with an error correcting code (ECC) process that is strong enough so that the tag information can be refreshed less often than usual, saving additional energy.

Figure 5:
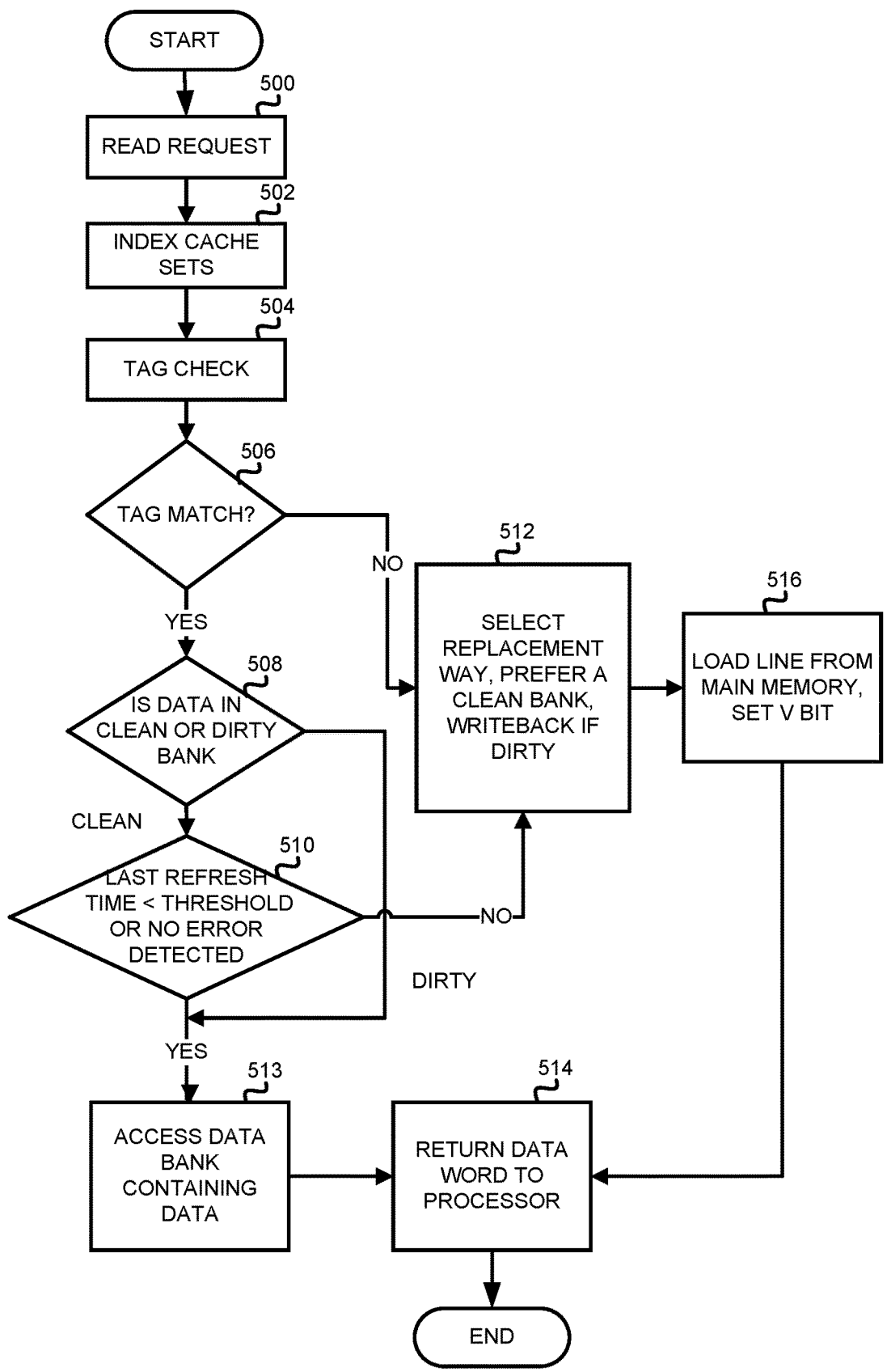
FIG. 5 is a flowchart illustrating one example of a method for controlling cache line storage in cache memory in accordance with the disclosure.

Referring to FIG. 5, a method for controlling cache line storage in cache memory in response to a read request from a memory client is illustrated. As shown in block 500, a read request is received by the cache memory controller 108 from a memory client. As shown in block 502, the received address is evaluated to determine the cache set index from the address to select a set index of the cache memory, as known in the art. As shown in block 504, a tag check is performed to determine whether the cache line tag check results in a hit or miss. As shown in block 506, if the tag associated with the read request matches that of a tag in the tag memory 120, as shown in block 508, the method includes determining if the data is in the clean bank 208 or dirty bank 210. This is determined by the cache memory controller 108, in one example, using the hit/miss signals 214 and 216. The bank number which contained the data (a cache hit) is used to index the clean/dirty register 200, determining if the data is in a clean bank or dirty bank.

As shown in block 510, if the data is determined to be in the clean data only partition, the method includes determining whether the clean cache memory bank has been refreshed within a desired period of time and if not, then the cache memory controller refetches the data from non-cache memory, such as main memory, as shown in block 512. One example of determining whether the clean cache memory bank has been refreshed within the desired period of time includes the cache memory controller maintaining a counter and determining if the last refresh time period is less than a desired threshold.

In another example, instead of or in addition to checking the time that a refresh has occurred for the clean data only bank, when the clean data is retrieved, an error detection operation occurs such as performing an error detection process on the accessed clean data and using the accessed clean data when the error detection check passes. If an error is detected, the cache memory controller 108 refetches the clean data from the cache bank designated for clean data only. The accessing of the clean data bank is shown in block 513. A low overhead error detection process in one example is employed such as a parity check or cyclic redundancy check (CRC).

In another example, when the clean cache memory bank has been refreshed within the desired period of time, the method includes accessing the clean data from the cache bank designated for clean data and using the accessed clean data independent of an error correction check on the accessed clean data.

As shown in block 514, after the clean data only has been accessed, the data is returned to the requesting memory client. Referring back to block 512, when no tag match exists, the method includes selecting a replacement cache location and a clean bank is preferred. On a read request with no tag match (a miss), the controller 108 first evicts an existing cache line to make space for the new one. If the replacement algorithm (e.g. LRU) determines that a dirty line is to be replaced, it has to be written back to memory (evicted) if it is dirty, before being replace with the new read address. As shown in block 516, the method includes loading the line from main memory and setting the valid bit for the cache line and returning the data to the requesting memory client as shown in block 514.

Figure 6:
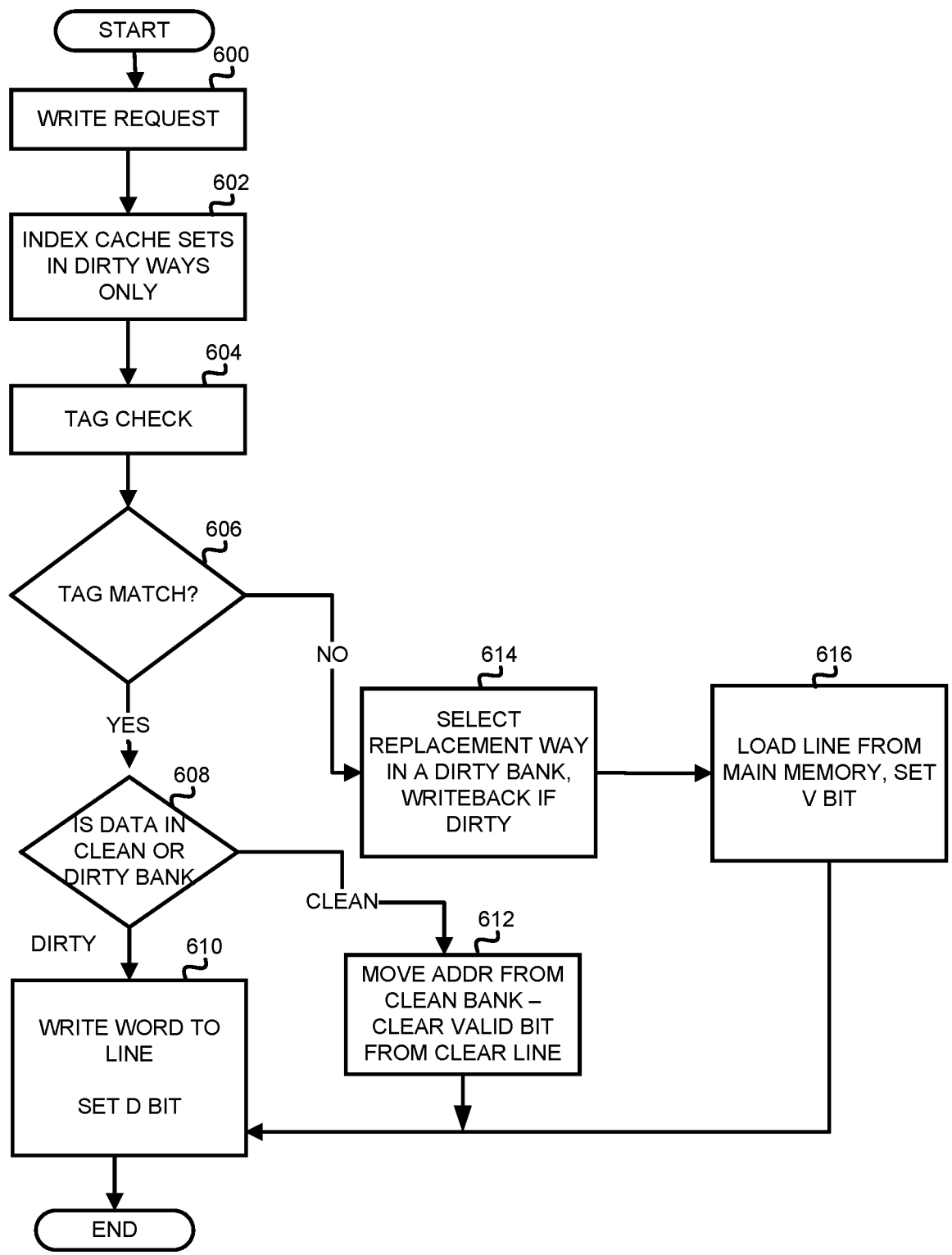
FIG. 6 is a flowchart illustrating one example of a method for controlling cache line storage in cache memory in accordance with the disclosure.

FIG. 6 illustrates an example of processing a write request from a memory client as shown in block 600. As shown in block 602, the method includes indexing the cache sets in dirty cache partitions only. This is achieved by disabling any index signals 219 or 224 for banks which are classified as clean only, by register 200.

As shown in block 604, the method includes checking the tags and as shown in block 606, if there is a tag match as shown in block 608, a determination is made whether the data is in the clean data only partition or a dirty data partition. As shown in block 610, the method includes writing the word from the write request to the dirty cache line and setting the dirty bit. This cache line is stored in the dirty data partition. However, as shown in block 612, if there is a write request and the data is in the clean data only partition, the method includes moving the address from the clean data only partition to the dirty data partition by, for example, clearing the valid bit from the clean line and/or moving the data to the dirty data partition.

As shown in block 614, if no tag match is detected after a write request, the method includes selecting a replacement cache location in a dirty bank. As shown in block 616, the write request is processed by loading a line from the main memory and setting the valid bit. The method includes, as shown in block 610, setting the dirty bit.

Among other advantages, because of the physical split between clean data and dirty data lines, utilization of some cache locations of the cache may become infrequent. To rebalance the distribution, the cache memory controller in one example forces write backs in eviction of dirty cache lines so that future cache fills occur into unoccupied clean data only banks. In one example, a direct bank-to-bank transfer can occur to migrate the line if the memory is structured to have this capability. In another embodiment, a dirty bit can be included in tags of the dirty banks to allow storage of both clean and dirty lines in the dirty or normally refreshed banks.

As noted above, less complex refresh control mechanisms can be employed that rely on low overhead error correcting codes if desired or no error detection need be performed. In addition, improved power efficiency is provided for example, such as in low power mode conditions or in other conditions, such that the clean data only partitions have refresh rates that are reduced compared to those of the dirty bank partitions or refresh may be shutoff to save power. Other advantages will be recognized by those of ordinary skill in the art.

Also as set forth above, in one example, in response to a read request or write request from a memory client, the cache memory controller checks whether a tag associated with the address to be read or written matches a tag associated with a cache line in the cache memory using the tag comparators. When a tag match is detected, the cache memory controller determines whether the address to be read or written corresponds to a cache line in the partition containing dirty data 210 or the cache memory partition designated for clean data only 208. This may be done, for example, by using the index 224 so that the cache memory controller can appropriately process the read or write request. For example, if the read or write request tag is a hit in the partition containing dirty data 210, conventional processing occurs to handle the read or write request. However, as further set forth below, if the index 224 indicates that the tag hit is for a cache line in the clean data only cache, two processes may be employed. In one example, on a clean data only cache access in low power mode, the cache memory controller can read data directly from memory or temporarily revert the clean cache to a normal operating mode to fill the cache line.

In another example, on a clean cache access in low power mode, the cache memory controller performs a low complexity error detection such as a parity check or CRC process. If no error occurs, the method includes proceeding to access the cache line. If desired, in one example, the partition designated as the clean data only partition 208 is changed to a normal power mode by increasing the refresh rate or turning the refresh rate mechanism back on for the particular bank or banks or die designated as the clean data only partition. If an error was detected, the method includes reloading the data from the main memory into the cache line.

Also, integrated circuit fabrication systems (e.g., work stations including, as known in the art, one or more processors, associated memory in communication via one or more buses or other suitable interconnect and other known peripherals) are known that create wafers with multiple dies that contain integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and structure is created using such integrated circuit fabrication systems.

In such a system, the non-transitory computer readable medium stores instructions executable by one or more processors in the integrated circuit fabrication systems that causes the integrated circuit fabrication system to produce one or more dies including at least one memory client, a cache memory controller, operatively coupled to the at least one memory client and operative to interface with cache memory. The cache memory controller is operative to partition the cache memory into at least a clean data only partition and a dirty data partition and determine whether a cache line contains dirty data or clean data only. The cache memory controller is also operative to store the cache line containing dirty data in a cache memory partition designated to store dirty data when the cache line contains dirty data, and store the cache line in the cache memory partition designated for clean data only, when the cache line contains only clean data.

In one example, the non-transitory storage medium also contains executable instructions that when executed causes the integrated circuit fabrication system to produce the die to include a cache bank status register operatively coupled to the cache memory controller, and wherein the cache memory controller to be operative to partition the cache memory in response to the cache bank status register to contain cache bank partition data indicating which partition of cache memory stores clean data only and which partition of memory stores dirty data. The cache memory controller also being operative to reduce power consumption of the at least one cache bank allocated to store clean data only based on the cache bank partition data.

In one example, the non-transitory storage medium contains executable instructions that when executed causes the integrated circuit fabrication system to produce the cache memory controller to be operative to determine whether the clean cache memory bank has been refreshed within a desired period of time based on a counter, and if not, then re-fetching the data from non-cache memory.

In one example, the non-transitory storage medium contains executable instructions that when executed causes the integrated circuit fabrication system to produce the cache memory controller so that when the clean cache memory bank has been refreshed within the desired period of time, the cache memory controller is operative to access the clean data from the cache bank designated for clean data and use the accessed clean data independent of an error correction check on the accessed clean data.

Among other benefits, physically partitioning clean and dirty cache lines into separate memory partitions, such as one or more banks, allows further power savings such as during low power operation. The cache memory controller reduces power consumption of the cache memory containing the clean only data. The cache memory controller controls the refresh operation so that a data refresh does not occur for clean data only banks or the refresh rate is reduced for clean data only banks. Other advantages will be recognized by those having skill in art.

The above detailed description and the examples described therein have been presented for the purposes of illustration and description only and not for limitation. For example, the operations described may be done in any suitable manner. It is therefore contemplated that the present embodiments cover any and all modifications, variations or equivalents that fall within the scope of the basic underlying principles disclosed above and claimed herein. Furthermore, while the above description describes hardware in the form of a processor executing code, hardware in the form of a state machine or dedicated logic capable of producing the same effect, other structures are also contemplated.

What is claimed is:

1. A method for controlling cache line storage in cache memory, the method comprising:
    partitioning, by logic, the cache memory into at least a clean data only partition;
    determining, by the logic, whether a cache line contains dirty data or clean data only, and
    controlling power such that the cache line containing only clean data has a lower power consumption than the cache line containing dirty data, by controlling a refresh operation of the clean data only partition so that at least one of: a data refresh does not occur for clean data only banks, or the refresh rate is reduced for clean data only banks.

2. The method of claim 1, wherein partitioning the cache memory comprises:
    accessing a cache bank status register that contains cache bank partition data indicating which partition of the cache memory stores clean data only and which partition of the cache memory stores dirty data; and
    reducing power consumption of the at least one cache bank allocated to store clean data only based on the cache bank partition data.

3. The method of claim 1, further comprising determining whether the clean cache memory bank has been refreshed within a desired period of time, and if not, then re-fetching the data from non-cache memory.

4. The method of claim 3, further comprising when the clean cache memory bank has been refreshed within the desired period of time, accessing the clean data from the cache bank designated for clean data only and using the accessed clean data independent of an error correction check on the accessed clean data.

5. The method of claim 1, further comprising:
    accessing the clean data from the cache bank designated for clean data only;
    performing an error detection process on the accessed clean data; and
    using the accessed clean data when the error detection check passes, otherwise re-fetching the clean data from the cache bank designated for clean data only.

6. The method of claim 1, further comprising:
    in response to a read request or a write request, checking whether a tag associated with the address to be read or written matches a tag associated with a cache line in the cache memory; and
    when a tag match is detected, determining whether the address to be read or written corresponds to a cache line in the partition containing dirty data or the cache memory partition designated for clean data only.

7. The method of claim 1 comprising:
    partitioning the cache memory into a dirty data partition;
    storing the cache line in the cache memory partition designated to store dirty data, when the cache line contains dirty data; and
    storing the cache line in the cache memory partition designated for clean data only, when the cache line contains only clean data.

8. An integrated circuit (IC), comprising:
    a cache memory;
    a cache memory controller, operatively coupled to the cache memory, the cache memory controller operative to:
    partition the cache memory into at least a clean data only partition;
    determine whether a cache line contains dirty data or clean data only; and
    control power such that the cache line containing only clean data has a lower power consumption than the cache line containing dirty data, by controlling a refresh operation of the clean data only partition so that at least one of: a data refresh does not occur for clean data only banks, or the refresh rate is reduced for clean data only banks.

9. The IC of claim 8, further comprising:
    a cache bank status register operatively coupled to the cache memory controller; and
    wherein the cache memory controller is further operative to:
    partition the cache memory by accessing the cache bank status register that contains cache bank partition data indicating which partition of cache memory stores clean data only and which partition of cache memory stores dirty data; and
    reduce power consumption of the at least one cache bank allocated to store clean data only based on the cache bank partition data.

10. The IC of claim 8, wherein the cache memory controller is further operative to determine whether the clean cache memory bank has been refreshed within a desired period of time based on a counter, and if not, then re-fetching the data from non-cache memory.

11. The IC of claim 10, wherein when the clean cache memory bank has been refreshed within the desired period of time, the cache memory controller is further operative to:
  access the clean data from the cache bank designated for clean data; and
  use the accessed clean data independent of an error correction check on the accessed clean data.

12. The IC of claim 8, wherein the cache memory controller further is operative to:
  access the clean data from the cache bank designated for clean data only;
  perform an error detection process on the accessed clean data; and
  use the accessed clean data when the error detection check passes, otherwise re-fetch the clean data from the cache bank designated for clean data only.

13. The IC of claim 8, wherein the cache memory controller, in response to a read request or a write request, is further operative to:
  check whether a tag associated with the address to be read or written matches a tag associated with a cache line in the cache memory; and
  when a tag match is detected, determine whether the address to be read or written corresponds to a cache line in the partition containing dirty data or the cache memory partition designated for clean data only.

14. The integrated circuit of claim 8 wherein the memory cache controller is operative to:
  partition the cache memory into a dirty data partition;
  store the cache line in the cache memory partition designated to store dirty data, when the cache line contains dirty data; and
  store the cache line in the cache memory partition designated for clean data only, when the cache line contains only clean data.

15. The integrated circuit of claim 8 comprising at least one memory client operatively coupled to the cache memory controller.

16. A non-transitory storage medium containing executable instructions that when executed causes an integrated circuit fabrication system to produce a die comprising:
  a cache memory controller, operative to interface with a cache memory, the cache memory controller operative to:
  partition the cache memory into at least a clean data only partition and a dirty data partition;
  determine whether a cache line contains dirty data or clean data only;
  store the cache line in the cache memory partition designated to store dirty data, when the cache line contains dirty data;
  store the cache line in the cache memory partition designated for clean data only, when the cache line contains only clean data; and
  control power such that the cache line containing only clean data has a lower power consumption than the cache line containing dirty data, by controlling a refresh operation of the clean data only partition so that at least one of: a data refresh does not occur for clean data only banks, or the refresh rate is reduced for clean data only banks.

17. The non-transitory storage medium of claim 16 containing executable instructions that when executed causes the integrated circuit fabrication system to produce the die to include a cache bank status register operatively coupled to the cache memory controller; and
  wherein the cache memory controller is further operative to:
  partition the cache memory by accessing the cache bank status register that contains cache bank partition data indicating which partition of cache memory stores clean data only and which partition of cache memory stores dirty data; and
  reduce power consumption of the at least one cache bank allocated to store clean data only based on the cache bank partition data.

18. The non-transitory storage medium of claim 16 containing executable instructions that when executed causes the integrated circuit fabrication system to produce the cache memory controller to be operative to determine whether the clean cache memory bank has been refreshed within a desired period of time based on a counter, and if not, then re-fetching the data from non-cache memory.

19. The non-transitory storage medium of claim 16 containing executable instructions that when executed causes the integrated circuit fabrication system to produce the cache memory controller so that when the clean cache memory bank has been refreshed within the desired period of time, the cache memory controller is operative to access the clean data from the cache bank designated for clean data and use the accessed clean data independent of an error correction check on the accessed clean data.

20. The non-transitory storage medium of claim 16 containing executable instructions that when executed causes the integrated circuit fabrication system to produce the die to include at least one memory client operatively coupled to the cache memory controller.

21. A method for controlling cache line storage in cache memory, the method comprising:
  partitioning, by logic, the cache memory into at least a clean data only partition and a dirty data partition by designating at least one of a plurality of dynamic random access memories (DRAM) memories to store clean data only and at least a different one of the plurality of DRAM memories to store at least dirty data;
  determining, by the logic, whether a cache line contains dirty data or clean data only,
  storing, by the logic, the cache line in the cache memory partition designated to store dirty data, when the cache line contains dirty data;
  storing, by the logic, the cache line in the cache memory partition designated for clean data only, when the cache line contains only clean data; and
  controlling the DRAM memory designated to store clean data only to have a lower power consumption than the DRAM memory designated to store the dirty data, by controlling a refresh operation of the cache memory partition designated for clean data only so that at least one of: a data refresh does not occur for clean data only partitions, or the refresh rate is reduced for clean data only partitions.

22. An integrated circuit (IC), comprising:
  a cache memory;
  a cache memory controller, operatively coupled to the cache memory, the cache memory controller operative to:

partition the cache memory into at least a clean data only partition and a dirty data partition by designating at least one of the plurality of DRAM memories to store clean data only and at least a different one of the plurality of DRAM memories to store at least dirty data;

determine whether a cache line contains dirty data or clean data only;

store the cache line in the cache memory partition designated to store dirty data, when the cache line contains dirty data;

store the cache line in the cache memory partition designated for clean data only, when the cache line contains only clean data; and control the DRAM memory designated to store clean data only to have a lower power consumption than the DRAM memory designated to store the dirty data, by controlling a refresh operation of the cache memory partition designated for clean data only so that at least one of: a data refresh does not occur for clean data only partitions, or the refresh rate is reduced for clean data only partitions.

23. The integrated circuit of claim 22 comprising at least one memory client operatively coupled to the cache memory controller.

* * * * *